United States Patent [19]
Juprasert et al.

[11] Patent Number: 5,942,469
[45] Date of Patent: Aug. 24, 1999

[54] HEAVY OIL WELL STIMULATION COMPOSITION AND PROCESS

[75] Inventors: Max S. Juprasert, Bakersfield; Bruce W. Davis, Fullerton, both of Calif.

[73] Assignee: Chevron U.S.A. Inc., San Francisco, Calif.

[21] Appl. No.: 08/659,226

[22] Filed: Jun. 5, 1996

Related U.S. Application Data

[62] Division of application No. 08/433,731, May 3, 1995, Pat. No. 5,547,022.

[51] Int. Cl.$^6$ .............................. C09K 3/00; E21B 43/00; E21B 37/06
[52] U.S. Cl. .................... 507/202; 507/233; 507/234; 507/255; 507/261; 507/265; 507/267; 507/927; 507/929; 166/263; 166/304; 166/371
[58] Field of Search ........................ 507/233, 234, 507/927, 929, 103, 255, 261, 265, 267, 202; 166/263, 304, 371; 252/358

[56] References Cited

U.S. PATENT DOCUMENTS

| | | | |
|---|---|---|---|
| 4,029,596 | 6/1977 | Fink et al. ............................ | 252/329 |
| 4,381,241 | 4/1983 | Romenesko et al. ................. | 507/127 |
| 4,421,656 | 12/1983 | Donatelli et al. ................... | 507/127 |
| 4,626,377 | 12/1986 | Kavchok et al. .................... | 252/358 |
| 5,431,853 | 7/1995 | Tsuda et al. ........................ | 252/358 |
| 5,547,022 | 8/1996 | Juprasert et al. ................... | 166/263 |
| 5,587,354 | 12/1996 | Duncan, Jr. ........................ | 507/137 |
| 5,599,481 | 2/1997 | Walger ................................ | 252/358 |

*Primary Examiner*—Philip Tucker
*Attorney, Agent, or Firm*—Burns, Doane, Swecker & Mathis, L.L.P.

[57] ABSTRACT

A composition for and an improved process of, enhancing petroleum recovery from a petroleum reservoir by injecting said composition into the reservoir through a wellbore are provided. The aqueous composition is derived from a concentrate which includes a defoaming agent, a demulsifying agent, and optionally a stabilizing agent suitable for stabilizing the concentrate as an aqueous emulsion. In one embodiment, the defoaming agent is dispersed in carrier solvent and the concentrate further includes an emulsifying agent suitable for emulsifying the carrier solvent in water. The composition is preferably injected at a high pumping rate directly into the formation through the tubing-casing annulus and allowed to permeate into the reservoir surrounding the wellbore before oil production commences. The composition and method are particularly suited for used in conjunction with steam injection oil recovery techniques.

20 Claims, 1 Drawing Sheet

HEAVY OIL WELL STIMULATION COMPOSITION AND PROCESS

This application is a divisional, of application Ser. No. 08/433,731, filed May 3, 1995, U.S. Pat. No. 5,547,022.

FIELD OF THE INVENTION

This invention relates to enhanced oil recovery from petroleum-bearing formations. More particularly, it relates to an improved method of stimulating petroleum from hydrocarbon bearing formations wherein foams and emulsions are both present in and around the wellbore, either naturally or as a result of fluid (steam, water or non-condensable gases) injection.

BACKGROUND OF THE INVENTION

Oil in virtually all reservoirs contains dissolved gases which originate internally within the oil. During oil production, oil flows from the formation towards the wellbore which results in two critical phenomena. First, the oil reaching the wellbore is at a lower pressure relative to oil in the formation. This pressure depletion leads to the evolution of dissolved gases which causes bubbles to form in the oil. The presence of these dispersed bubbles increases the effective viscosity of the oil. The viscosity effect is particularly pronounced in reservoirs of heavy oils. Although the amount of dissolved gas may not be large, the effect can be significant because of the high stability of the foam and its ability to build up over time. By way of comparison, at atmospheric pressure, a heavy oil sample is capable of sustaining bubbles (e.g., foams) of free gas in solution as long as 4 to 5 hours before the gas is liberated. In contrast, free gas may be liberated from light oil in less than 1 minute. Furthermore, in heavy oil, some of the evolved gas in the form of bubbles (or foams) may be immobile, that is, the gas cannot flow to the wellbore or migrate upward in the formation; rather, the viscous oil accumulates around the wellbore. This phenomenon has been observed in low gravity oil (below 20° API) reservoirs, such as shallow San Joaquin Valley fields in California with a depth of less than 1,500 feet.

The second phenomenon associated with the flow of oil towards the wellbore is that the velocity of the oil reaching the wellbore is higher than the oil velocity at other parts of the reservoir. If water is present in the vicinity of the wellbore, the attendant mixing of the immiscible oil and water caused by the velocity increase results in the formation of emulsions that are stabilized by fine particles or asphaltenes from the crude oil. These are generally oil external emulsions which have higher viscosities than either oil or water in the formation. The effective viscosity is determined principally by the amount of water dispersed in the oil. The water may be connate and/or water from steam injection. Both phenomena generally occur at the same time, that is, the oil viscosity is enhanced by the presence of both the gas bubbles and dispersed water droplets.

Cyclic or continuous steam injection is the preferred thermal process for recovering heavy oils. Steam is injected from one or more injection wells located in the vicinity of the production wellbore. The heat released from the condensing steam reduces the oil viscosity and improves its mobility through the formation during production. However, introduction of a foreign fluid (e.g., wet steam) into the reservoir enhances emulsification of oil and water. In addition, this viscous emulsion also appears to stabilize the foams. As is apparent, the presence of the foamy emulsion near the wellbore can drastically reduce well production by interfering with oil flow into the wellbore. Furthermore, foam which enters inside the casing of the wellbore also reduces pumping efficiency and increases wear.

One approach to stimulating well production as described in U.S. Pat. No. 3,481,404 to Gidley involves injecting an acid solution into the wellbore followed by an afterflush that consists of a hydrocarbon oil and a solvent miscible with oil and water. Diesel fuels are the preferred hydrocarbon oil and glycol ethers such as ethylene glycol monobutyl ether are preferred solvents. While this technique has been successful in some reservoirs where emulsion formation near the wellbore is minimum, this process is not particularly applicable to heavy oil reservoirs where steam injection is also employed.

Accordingly, this invention is directed to improving the mobility of oil in a reservoir formation, especially in and near the wellbore by suppressing or extinguishing foams and emulsions and by increasing the oil relative permeability in the near wellbore region.

SUMMARY OF THE INVENTION

The present invention provides a near wellbore treatment concentrate and composition and a process for stimulating oil production, especially from thermal production wells.

Accordingly, in one of its compositional aspects, the invention is directed to a wellbore treatment concentrate which forms an aqueous well treatment composition when mixed with water comprising:

a defoaming agent suitable for extinguishing foams in oil-brine-gas systems;

a demulsifying agent, suitable for demulsifying oil external emulsions, that comprises a first surface active agent selected from the group consisting of first nonionic surface active agents, first anionic surface active agents and mixtures thereof; and optionally, a stabilizing agent suitable for stabilizing said concentrate as an aqueous emulsion.

In a preferred embodiment, the defoaming agent is dispersed in an organic liquid. The concentrate can further comprise an emulsifying agent, suitable for emulsifying the organic liquid in water, that comprises a second surface active agent selected from the group consisting of second nonionic surface active agents, second anionic surface active agents, and mixtures thereof.

In practice, the wellbore treatment composition is prepared by diluting a wellbore treatment concentrate with water prior to use.

In one of its method aspects, the invention is directed to a process of treating a subterranean formation surrounding a wellbore to increase the production of crude oil therefrom, which process comprises the step of contacting said formation with a wellbore treatment composition.

In operation, the wellbore treatment composition is injected through the production well into the formation surrounding the wellbore. Thereafter, oil production is stopped to allow the composition to permeate into the formation before production is resumed. A soak period of several hours following injection enhances stimulation. Production wells so treated have shown significant increases in oil production; moreover, the improvement remains in effect for several weeks up to about a month. Thereafter, the well is treated again to break up foamy emulsion which has reformed during this period of time.

DESCRIPTION OF THE INVENTION

Figure 1:
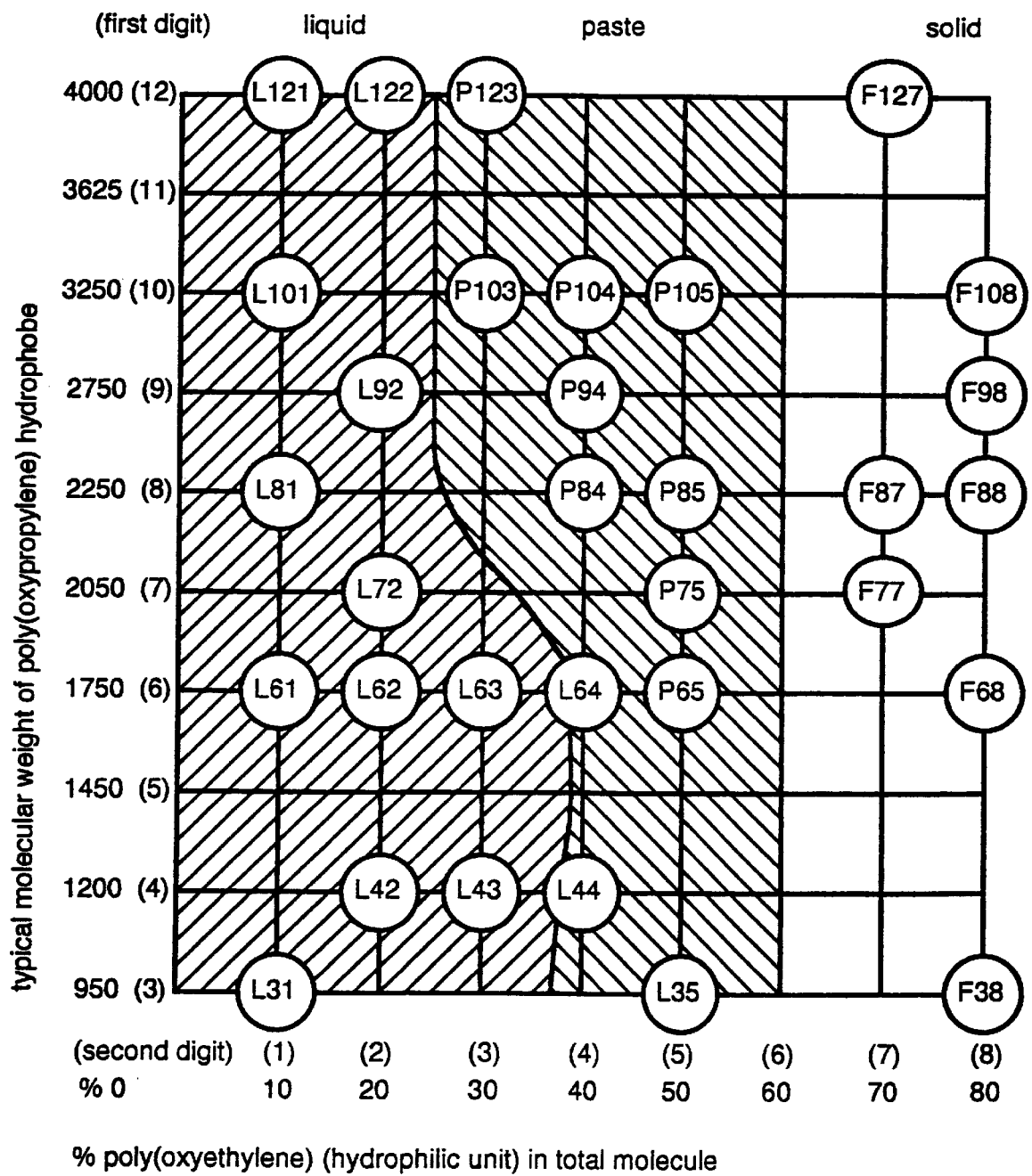
FIG. 1 is the PLURONIC™ grid or graph of percent poly(oxyethylene) vs. typical molecular weight of poly (oxypropylene) for the polyoxyalkylene derivatives encompassed by the PLURONIC™ series of polyols.

The present invention provides an aqueous wellbore treatment concentrate (and aqueous composition thereof) and a method of treating a subterranean formation in and around the wellbore to increase the production of hydrocarbons (crude oil) therefrom.

The invention is based in part on the discovery that injection of the wellbore treatment composition (also referred to herein as the "composition") into the wellbore dramatically increases oil production for a substantial length of time relative to the amount of composition used and the duration of injection. The ability of the composition to effectively defoam and demulsify the region around the wellbore is believed responsible for the improved oil production. The invention is particularly suited for use in stimulating the production of low gravity crude oil; i.e., the produced crude oil has a gravity of about 20° API or less, from thermal producing wells, although the composition and method are also generally applicable to non-thermal producing wells.

Field observations show that for the wellbore treatment concentrate or composition to be effective it must contain both the defoaming and demulsifying agents as defined herein.

Formulations

In one embodiment, the inventive aqueous wellbore treatment concentrate comprises effective amounts of:

(a) a defoaming agent suitable for extinguishing foams in oil-brine-gas systems;

(b) a demulsifying agent, suitable for demulsifying oil external emulsions, that comprises a first surface active agent selected from the group consisting of first nonionic surface active agents, first anionic surface active agents and mixtures thereof; and (c) optionally, a stabilizing agent, suitable for stabilizing the concentrate in the form of an aqueous emulsion.

The wellbore treatment concentrate (also referred to herein as the "concentrate") is preferably formulated as a stable aqueous emulsion which has a shelf-life of four to eight weeks or more when stored at a temperature between about 50° F. (10° C.) to about 90° F. (32° C.). By "shelf-life" is meant the time period during which the emulsion does not separate into discrete insoluble phases, e.g., one containing the defoaming agent and another containing the demulsifying agent. The stabilizing agent (e.g., thickener) is optionally employed to maintain the emulsion. It is understood that the defoaming and demulsifying agents can remain active beyond the shelf-life, although it may be necessary to redisperse the components by mechanical agitation prior to use.

In a second embodiment, the aqueous inventive wellbore treatment concentrate comprises effective amounts of:

(a) a defoaming agent suitable for extinguishing foams in oil-brine-gas systems wherein the defoaming agent is dispersed in an organic liquid;

(b) a demulsifying agent, suitable for demulsifying oil external emulsions, that comprises a first surface active agent selected from the group consisting of first nonionic surface active agents, first anionic surface active agents and mixtures thereof;

(c) an emulsifying agent, suitable for emulsifying the organic liquid in water, wherein the emulsifying agent comprises a second surface active agent selected from the group consisting of second nonionic surface active agents, second anionic surface active agents, and mixtures thereof; and (d) optionally, a stabilizing agent, suitable for stabilizing the concentrate in the form of an aqueous emulsion.

In the second embodiment, the organic liquid serves as a carrier for the defoaming agent. Thus the concentrate is an emulsion wherein the organic liquid, that contains the defoaming agent, constitutes a disperse phase. The emulsifying agent serves to obtain and to maintain the organic liquid in the disperse phase. The function of the emulsifying agent is distinguished from that of the stabilizing agent as the latter functions to maintain the entire wellbore treatment concentrate as a stable emulsion.

Preferably, the wellbore treatment concentrate is an aqueous mixture comprising (1) about 1 to about 20%, more preferably about 0.5 to about 5%, and most preferably about 0.5 to about 2% of said defoaming agent, (2) about 1 to about 10%, more preferably about 2 to about 8%, and most preferably about 3 to about 6% of said demulsifying agent, (3) about 1 to about 15%, more preferably about 5 to about 14%, and most preferably about 8 to about 12%, of said emulsifying agent, when present and, (4) up to about 20%, more preferably about 0.1% to about 15%, and most preferably about 1 to about 15% of said stabilizing agent, when present. All percentages herein are on a weight basis unless noted otherwise.

When the defoaming agent is dispersed in an organic liquid, e.g., mineral oil, the defoaming agent/organic liquid dispersion collectively preferably comprises about 1 to about 50%, more preferably about 2 to about 30%, and most preferably about 5 to about 20% of the concentrate. Moreover, when an the organic liquid carrier is employed, the weight ratio of defoaming agent to organic liquid is preferably about ⅛ to about ½, more preferably about ½ to about ⅓, and most preferably about ⅕ to about ⅓.

In preferred formulations of the concentrate: (1) the demulsifying agent comprises one or more (preferably 1 to 3) first surface active agents wherein each first surface active agent independently comprises from about 0.5 to about 10%, more preferably about 1 to about 5%, and most preferably about 1 to about 3% of the concentrate, (2) the emulsifying agent, when present, comprises one or more (preferably 2 to 3) second surface active agents wherein each second surface active agent independently comprises from about 0.5 to about 12%, more preferably about 5 to about 12%, and most preferably about 8 to about 12% of the concentrate, and (3) the stabilizing agent, when present, comprises one or more (preferably 1 to 3) stabilizers wherein each stabilizer independently comprises from about 0.1 to about 16%, more preferably about 0.5 to about 16%, and most preferably about 1 to about 15% of the concentrate.

An aspect of the invention is that the concentration of the demulsifying agent should not be so high that it adversely affects the stability of the concentrate. In particular, when the concentrate is formulated as an emulsion (either with or without the use of the stabilizing agent), the concentration of the demulsifying agent should preferably not be so high as to destabilize the system, i.e. causes the concentrate to separate into discrete phrases. For this reason, it is preferred that the wellbore treatment concentrate comprise not more than about 10% (wt) of said demulsifying agent particularly if the concentrate is expected to be stored prior to use.

In general, it is understood that the relative amounts of defoaming agent (or defoaming agent that is dispersed in organic liquid), demulsifying agent, emulsifying agent, and stabilizing agent employed will to some extent depend on the operating conditions of the well, other secondary and tertiary recovery means employed, the composition of the oil-bearing formation, reservoir characteristics, and other parameters.

The inventive wellbore treatment concentrate (or aqueous composition thereof) is particularly suited for stimulating production from wellbores where both foams and emulsions (also referred to herein as "foamy emulsions") are present in the vicinity of the wellbores. It is believed that most of this foamy emulsion is found (or tends to develop) within about 0.5 to about 3 feet from the wellbore.

Defoaming Agents

Defoaming agents suitable for the present invention refer to any reagent that suppresses, extinguishes, or prevents foam near an oil production wellbore and the adjacent porous rock formation that contains oil, water (or brine), and/or non-condensable gases (e.g., carbon dioxide, nitrogen and natural gases). It has been found that most of the foam associated with thermal and non-thermal producing wells are formed principally from methane and to a lesser extent from ethane, propane, carbon dioxide, hydrogen sulfide, and other gases. Suitable, defoaming agents include for example, materials selected from silicone oils, silicone oil emulsions, organic defoamers, emulsions of organic defoamers, silicone-organic emulsions, silicone-glycol compounds, silicone/silica adducts, emulsions of silicone/silica adducts, and mixtures thereof.

The aqueous wellbore treatment concentrate is preferably a water external emulsion wherein the defoaming agent is present in the disperse phase. Emulsifying agents and/or stabilizing agents may be required depending on the defoaming agent employed. While the invention is not limited to any particular defoaming agent, it has been found that silicone-based defoaming agents comprising silicone/silica adducts (also referred to herein as "adducts") are particularly suited. Silicone/silica adducts are known in the art and generally comprise silicone coated on silica particles. In this case, the silicone is chemisorbed to the silica particles. The adducts are commercially available in the undiluted form (also commonly referred to as "pure" or 100% active" form) or, in diluted form as an aqueous emulsion. Although commonly referred to in the art as "pure" or "100% active, commercially available "pure" silicone/silica adducts usually contain additives which facilitate the dispersion of the silicone/silica adducts and thereby enhance their defoaming effect. A preferred 100% active silicone/silica adduct defoaming agent is available from Ross Chem. Inc. as FOAM BLAST 10"™.

Dilute forms of silicone/silica adducts (typically comprising about 5–50% active adduct) are available as aqueous emulsions. A preferred silicone/silica adduct emulsion defoaming agent is available from Ross Chem. Inc., Fountain Inn, S.C., under the tradename FOAM BLAST 230 to (10% active). Silicone defoaming agents (in pure form and as aqueous emulsions) are described is W. Noll, *Chem. and Tech. of Silicones* (Academic Press 1968) which is incorporated herein. Silicone defoaming agents are also described in U.S. Pat. No. 3,865,544 Keil which is also incorporated herein. Commercially available dilute forms of silicone/silica adducts may contain emulsifying agents and/or stabilizing agents that are suitable emulsifying agents and/or stabilizing agents for the inventive concentrate. (The stabilizing agent improves the shelf-life of the adduct as an aqueous emulsion.) Thus, when employing such commercially available adducts it may be unnecessary to further add these components (or that it may be necessary only to add supplemental amounts of emulsifying agents and/or stabilizing agents).

Demulsifying agents

Demulsifying agents suitable for the present invention refer to a surface-active agent that prevents, suppresses, or extinguishes water-in-oil emulsions. (Emulsions present near the wellbore are almost always of the water-in-oil type, which is also referred to as an oil external emulsion.) Preferred demulsifying agents include nonionic and anionic surfactants that, when added to an emulsion of crude oil and water, can effectively separate the emulsion into an oil phase and a water phase. It is believed that these demulsifying agents function by changing the wettability of solid particles entrained in the interface between water globules and the continuous water oil phase. This wettability change causes the particles to vacate the interface thereby destabilizing the emulsion. The elimination of the emulsion is expected to bring about a reduction in viscosity. Suitable nonionic surfactants include, for example, ethoxylated alkyl phenols, ethoxylated alcohols, block copolymers of ethylene oxide and propylene oxide, oxyalkylated glycol esters, and mixtures thereof.

Preferred nonionic surfactants include difunctional blockpolymers terminating in primary hydroxyl groups include polyoxyalkylene derivatives of propylene oxide and ethylene oxide and are available from BASF Corp., Parsippany, N.J., under the tradenames PLURONIC L-43 and PLURONIC L-92. A preferred embodiment of the wellbore treatment concentrate has a demulsifying agent that comprises about equal amounts of PLURONIC L43 and PLURONIC L-92. The PLURONIC polyols are commercially available nonionic surfactants which have variable polyoxypropylene (POP) and variable polyoxyethylene (POE) chains, offering an additional dimension of freedom in formulating desirable surfactant properties. The general structure of the PLURONIC polyols is:

$$\text{HO} - (\text{CH}_2\text{CH}_2-\text{O})_a(\overset{\overset{\displaystyle \text{CH}_3}{|}}{\text{CHCH}_2}-\text{O})_b(\text{CH}_2\text{CH}_2-\text{O}-)_c\text{H} \tag{I}$$

where a, b, and c are independently positive integers such that the molecular weight of the polyols range from about 1,000 to about 15,000.

By inspection of this formula the total molecular weight (M) of these materials is $$M=44(a+c)+59b+18.$$

Percent polyoxyethylene is defined by

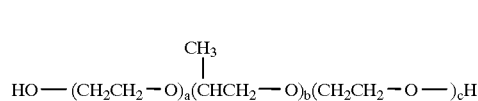

and the molecular weight of polyoxypropylene is defined by $$M_{pop}=59b.$$

It can be shown from these equations that the total molecular weight is $$M = \frac{M_{POP} + 18}{(1 - W_{POE})}$$

An investigation of the PLURONIC series of polyols revealed that certain blends of 2 or more, preferably of 2 or 3, PLURONIC polyols are particularly effective as demulsifying agents. The PLURONIC series comprise polyoxyalkylene derivatives of propylene glycol with molecular weights ranging from about 1,000 to above 15,000. They are available in liquid, paste, and flake powder, and cast-solid forms. FIG. 1 is a graph (also referred to as a "PLURONIC grid") of percent poly(oxyethylene) vs. typical molecular weight of poly(oxypropylene) for the polyoxyalkylene derivatives covered by the PLURONIC series. Each encircled item in the graph represents an individual PLURONIC product. As an illustration, L43 designates the product sold as PLURONIC L-43. The graph shows that this product comprises polyoxyakylene derivatives that have a typical molecular weight of poly(oxypropylene) of about 1,200 and that have about 20% poly(oxyethylene).

It has been found that PLURONIC polyol blends wherein (1) the weighted average of the values for percent poly(oxyethylene) is between the range of about 10 and about 40, more preferably about 20 and about 30, and (2) the weighted average of the values for typical molecular weight of poly(oxypropylene) is between the range about 1,400 and about 2,100, more preferably about 1,750 and about 2,050, are particularly effective as demulsifying agents. One particularly effective blend comprises about equal amounts of PLURONIC L-92 and PLURONIC L-43. As is apparent, the individual PLURONIC that are employed in a blend need not have percent poly(oxyethylene) and typical molecular weight of poly(oxypropylene) values that fall within the above ranges for the blend itself. It is expected that a single PLURONIC product which falls within the above ranges can also be used as a demulsifying agent, however, blends are more versatile as they provide higher demulsifying activity for different crude oil emulsions. Thus, by employing blends of two or more PLURONIC products it is feasible to prepare defoaming agents with specific (or range of) demulsifying properties.

Since the PLURONIC products are commercially available, a defoaming agent preferably comprises one or blends of these products. However, since the number of individual PLURONIC products is finite, there are some set of ranges (i.e., coordinates) in the grid that are not covered by individual commercially available products. It is understood that demulsifying agents of the present invention can include one or more polyol derivatives having the structures of Formula I which are synthesized; further, demulsifying agents can include blends of available PLURONIC product(s) and synthesized polyol derivatives.

Suitable anionic surfactants for the demulsifying agent include, for example, alkyl benzene sulfonates, alkyl toluene sulfonates, ethoxylated carboxylates, carboxylates, and mixtures thereof.

Emulsifying agents

Emulsifying agents of the present invention refer to surfactants which can emulsify the defoaming agent or emulsify the organic liquid (or other carrier solvent) in which the defoaming agent is dispersed. Suitable nonionic surfactants include, for example, (1) ethoxylated alkyl phenols, (2) ethoxylated alcohols, (3) block copolymers of ethylene oxide and propylene oxide, (4) oxyalkylated glycol esters, and mixture thereof. Suitable anionic surfactant include, for example, (5) alkyl benzene sulfonates, (6) alkyl toluene sulfonates, (7) ethoxylated carboxylates, (8) carboxylates, and mixtures thereof. While the primary function of the emulsifying agent is to obtain and maintain a stable emulsified dispersion of the defoaming agent (e.g., silicone/silica adduct) or organic liquid containing the adduct in water, it is expected that some emulsifying agents, namely (1), (3), (5) and (6) may also demonstrate demulsifying activity on oil external emulsions when the wellbore treatment concentrate (or aqueous composition thereof) is injected into the wellbore.

Preferably, a combination of 2 or 3 emulsifying agents is used. A preferred formulation comprises 2 emulsifying agents: one having a low HLB value and the other having a high HLB value. The hydrophilic-lipophilic balance (HLB) value is a measure of a surfactant's ability to make oil-water emulsions. A surfactant having a low HLB value, (i.e., less than about 10) is considered oil soluble (lipophilic) while a high HLB value (i.e., greater than about 12) is associated with water soluble (hydrophilic) surfactants.

Stabilizing Agent

To facilitate its handling, storage, and transport prior to use, the wellbore treatment composition is preferably formulated as a concentrate with a minimum amount of water. Water is added to the concentrate to form the wellbore treatment composition prior to use. To insure that the concentrate remains stable during storage, that is, to prevent the defoaming agent (or defoaming agent that is dispersed in the organic liquid) from segregating into discrete phases, stabilizers (e.g., thickeners ) are employed. As is apparent, the amount of the optional stabilizing agent employed should be adjusted according to the type of final product.

Preferred stabilizing agents include, for example, glycols such as ethylene glycol, propylene glycol, glycerol, polypropylene glycol, polyethylene glycol, and mixtures thereof. Another preferred stabilizing agent comprises a water soluble polymer that includes carboxymethyl cellulose, hydroxyethyl cellulose and other water soluble modified cellulosic polymers, xanthan gums, polyacrylamides, polysiloxane polyalkyl polyether copolymers, anionic acrylic copolymers, alkali metal alginates and other water soluble alginates, carboxyvinyl polymers, polyvinylpyrollidones, polyacrylates, and mixtures thereof.

Preparation of the Wellbore Treatment Concentrate

The inventive aqueous wellbore treatment concentrate is most preferably formulated as a stable water-external emulsion. While the invention is not limited to the particular processes by which the components are incorporated, preferred methods of preparing the concentrate are illustrated as follows:

I. Pure silicone/silica adduct. 100% active adduct is blended into an aqueous mixture containing emulsifying agents (e.g., a high HLB and a low HLB surfactant). After adding a demulsifying agent to the mixture, then either (i) add sufficient water to form a water-external emulsion or (ii) add sufficient mixture of water and stabilizing agent (e.g., thickener) to form a water-external emulsion.

Alternatively, 100% active adduct is dispersed (also referred to as being "dissolved") in a carrier solvent such as an organic liquid (e.g., mineral oil) and then the emulsifying agents are blended into the mixture. After adding a demulsifying agent to the mixture, then either (i) add sufficient water to form a water-external emulsion or (ii) add sufficient mixture of water and stabilizing agent (e.g., thickener) to form a water-external emulsion.

The adduct will usually disperse naturally in the organic liquid carrier solvent although mechanical agitation can be employed to facilitate dispersal. The organic liquid is preferably a hydrocarbon solvent which is a paraffinic or a paraffinic and naphthenic mixture. Examples include mineral oils, preferably linear paraffins, isoparaffins, and cycloparaffins. Preferred hydrocarbon solvents will have a flash point of about 140° F. or higher. Alternatively, the 100% active silicone-based defoaming agents could be dissolved in other carrier solvents such as, for example, liquid organic solvents, mixtures of liquid organic solvents, or mixtures of liquid organic solvents and water. Examples of this would include silicone oils or silicone-glycol compounds as defoaming agents. Liquid organic solvents or their mixtures would include hydrocarbon solvents, silicone oils and silicone-glycol copolymers. The term "carrier solvent" shall refer to any substantially insoluble solvent into which the defoaming agent is dispersed or dissolved.

II. Dilute silicone/silica adduct emulsion. When employing dilute forms of the silicone/silica adduct (e.g. aqueous emulsions), the demulsifying agent is first mixed into the emulsion. Thereafter, emulsifying agent and, optionally, stabilizing agent, (or supplemental amounts thereof) are added. If necessary, add water to produce the aqueous, stable water-external emulsion.

Alternatively, after mixing the demulsifying agent into the aqueous adduct emulsion, requisite amounts of an aqueous mixture containing a stabilizing agent (e.g., thickener) are added to produce the aqueous, stable water-external emulsion.

Preferred formulations of the wellbore treatment concentrate comprise the following:

Formulation I

|  | Wt % |
|---|---|
| FOAM BLAST 230 (10% defoaming agent) | 10.0 |
| Propylene Glycol | 15.0 |
| PLURONIC L-43 | 2.5 |
| PLURONIC L-92 | 2.5 |
| D. I. Water | 70.0 |
|  | 100.00 |

Formulation I is a temperature stable, translucent viscous emulsion that does not separate into different phases even during storage. FORM BLAST 230 comprises a silica/silicone adduct defoaming agent. Formulation I was prepared by mixing the Foam Blast 230™ into an aqueous mixture comprising deionized water, demulsifying agents (PLURONIC L-43 and L-92). Thereafter the stabilizing agent (propylene glycol) was added. The use of deionized water further reduces the likelihood of premature product degradation.

Formulation II

|  | Wt % |
|---|---|
| FOAM BLAST 10 | 2.0 |
| VISTA LPA-210 | 8.0 |
| IGEPAL CA-420 | 5.0 |
| IGEPAL CA-620 | 5.0 |
| PLURONIC L-43 | 2.5 |
| PLURONIC L-92 | 2.5 |
| D. I. Water | 75.0 |
|  | 100.00 |

Formulation II is a white milky emulsion which is somewhat less stable than Formulation I but is sufficiently stable for most applications. FOAM BLAST 10™ is a 100% active silicone/silica adduct. VISTA LPA-210 is a paraffinic solvent available from the Vista Chemical Co., Houston, Tex. IGEPAL CA-420 and IGEPAL CA-620 are emulsifying agents comprising ethoxylated octyl phenols and are available from Rhone-Ponlenc, Princeton, N.J. Formulation II was prepared by dispersing Foam Blast 10™ in the organic liquid (VISTA LPA-210) and mixing the emulsifying and demulsifying agents into the dispersion. Thereafter, deionized water was added to the dispersion.

Although the use of deionized water is preferred, the formulations can be prepared using tap water. In cases where the water is hard, e.g., contains mineral salts, a chelating agent may be added. A preferred formulation using tap water has the same components as Formulation II except that 4.5% IGEPAL CA-420 and 5.5% IGEPAL CA-620 are used instead. Alternatively, a different hydrocarbon solvent having a higher Kauri-Butanol number than VISTA LPA-210 can be blended with LPA-210 to improve stability in hard water. An example of such a solvent is VISTA MR SOLVENT.

Prior to injection into the wellbore, the concentrate is diluted with water to form the wellbore treatment composition. Preferably, after dilution of the concentrate, the composition formed comprises from about 0.1 to about 5% by volume of the concentrate, more preferably from about 0.5 to about 2.5%, and most preferably about 1%. It is expected that compositions having a higher percentage of concentrate, i.e., exceeding 5%, may have the undesired effect of acting as an emulsifying agent in and around the wellbore.

An aspect of the invention is that in order to enhance production of heavy crude oil, the concentrate must contain both the defoaming agent and the demulsifying agent. Indeed, initial attempts to increase production by treating formations with compositions that contained the defoaming agent but not the demulsifying agent actually reduced production. For example, when an aqueous defoaming fluid comprising FOAM BLAST 230 (10% defoaming agent) and propylene glycol was injected into wellbores, production actually decreased. (As is apparent, this aqueous defoaming fluid contains the same components as the above described Formulation I of the inventive wellbore treatment concentrate but without the demulsifying agents, i.e., PLURONIC L-43 and PLURONIC L-92.) It was found that although the defoaming fluid eliminated the foam (and prevented its formation) in the vicinity of the wellbore, the defoaming agent also emulsified the oil which caused its viscosity to increase significantly.

In contrast, treating formations with aqueous compositions derived from the Formulation I inventive concentration, which includes the demulsifying agent, not only prevented the defoaming agent from causing the oil to emulsify, but it also had the unexpected beneficial effect of partially demulsifying the oil and reducing viscosity.

Methodology

Foams and emulsions are usually created near wellbores when three or four ingredients are present: (1) a continuous liquid (oil or aqueous) phase, (2) a naturally occurring surface-active agent dissolved in oil or water that lowers the interfacial tension, (3) a gas phase comprising steam, non-condensibles principally natural gases such as methane and carbon dioxide, and (4) solid particles comprising clays, silt, and precipitated asphaltic materials. The aqueous phase comprises formation brine or a mixture of formation brine and condensed water from steam.

The process of treating a subterranean formation surrounding a wellbore to increase the production of hydrocarbons (crude oil) therefrom comprising of contacting said formation with the wellbore treatment concentrate or composition. Preferably, the wellbore treatment concentrate is diluted into an aqueous composition prior to injection into the wellbore. Alternatively, the concentrate can be is injected directly into the wellbore and allowed to mix with water in the wellbore and surrounding formation so that the aqueous wellbore treatment composition forms in situ. The required amount of wellbore treatment concentrate or composition injected through a particular wellbore, and into the production well depends, in part, on a number of factors that influence the amount of foamy emulsion present including: thickness of the oil-bearing reservoir, employment of other secondary and tertiary recovery means, quality and quantity of steam injected through the injection wells, and other reservoir characteristics, and other conditions adverse to pumping oil from the reservoir. "Thickness of the oil-bearing reservoir" or "reservoir thickness" refers to the distance between the upper and lower boundaries of a subterranean formation containing oil, which can range from a few feet to hundreds of feet.

The reservoir thickness is a convenient gauge for calculating the approximate amount of composition to be delivered. In a preferred embodiment, the amount of composition injected in the product well should range from 10 to about 50 gallons per foot of reservoir thickness. More preferably, about 15 to about 30 gallons per foot, and most preferably about gallons per foot are injected.

Delivery of the wellbore treatment concentrate or composition into the formation through the wellbore can be achieved by conventional means. A preferred method is bullheading whereby the wellbore treatment fluid is pumped down the tubing string. The fluid is forced into the formation which has a packer set above the region of the formation to be treated. Specifically, with the bullhead pumping technique the wellbore treatment fluid is pumped into the well annulus between the casing and the tubing and allowed to flow down the annulus while the sucker rods, pump, and associated equipment remain in the well. Thus, as the fluid is being delivered into the formation, production can continue. After delivery has been completed, preferably production is stopped to allow the treatment fluid to soak into the formation. With bullhead pumping, chemical or mechanical diverters are not required.

High pressure pump injection is employed; and, for a typical 1,000 foot well, the minimum required pump rate is about 4–5 barrels per minute. In addition, the wellbore treatment fluid (i.e., concentrate or aqueous composition) can be injected while oil is being simultaneously produced, although if concentrate is injected it is preferred that production cease during injection. Preferably, after the treatment fluid has been delivered, production is shut down for a sufficient amount of time to enable the treatment to (1) defoam and demulsify the foamy emulsion in the vicinity of the wellbore and (2) to permeate further into the formation before resuming production. Two to four hours downtime should be sufficient. Once production begins, as the components of the treatment fluid flow toward the wellbore, the components breakup existing foamy emulsion and prevent, for a time, formation of more foamy emulsion.

It is contemplated that the inventive method will be implemented in conjunction with existing steam injection techniques for improving oil recovery. It is contemplated that when steam stimulation is employed that the steam is injected into the formation through injection well(s) that are strategically located near the vicinity of the wellbore into which the inventive concentrate or composition is injected. Furthermore, the wellbore treatment concentrate or composition may be used by itself or in combination with other treatment fluids. For example, a well which has asphaltic or waxy deposits in the wellbore or near wellbore region might require a solvent pre-treatment to remove such deposits prior to using the wellbore treatment fluid for defoaming and demulsifying. The solvent treatment could be a refined solvent or intermediate refinery stream depending on the nature of the asphaltic or waxy deposit. The solvent treatment could also be a formulated solvent containing oil soluble or oil dispersible nonionic or anionic surfactants or both, polar solvents such as alcohols, glycols, ethers, esters, ketones, glycol ethers, and mixed hydrocarbon solvents containing aliphatic, alicyclic, cycloaromatic, aromatic, or polynuclear aromatic compounds.

In thermally processed reservoirs employing either continuous injection or cyclic injection, the inventive method can be practiced with production and injection wells that are arranged in any pattern. Preferably, the injection well is surrounded by production wells in a regular pattern, such as in an inverted five-spot pattern having four production wells forming the corners of a square with an injection well situated at the center of the square.

Field Tests

Tests of the inventive method and wellbore treatment concentrate and composition were carried out on thermal and non-thermal wells at the Cymric-McKittrick Field located near Bakersfield, Calif. Production and injection wells were generally arranged in inverted five-spot patterns where the production wells are separated from each other by a distance of approximately 100 to 400 feet (30.5 to 122 m). Steam was injected into the injection wells at a continuous 24 hour basis at a rate of about 50 to 700 barrels of steam equivalent water per day. The steam temperature was about 300° to 500° F. (149° to 260° C.). The above described Formulation I of the wellbore treatment concentrate was tested first.

Initially, several production wells were treated by dribbling the wellbore treatment concentrate down the casing, simultaneous with oil production, for the purpose of defoaming and demulsifying fluids which entered the wellbore. The concentrate was delivered at approximately 1000 ppm of total fluid production, recognizing that the amount was well in excess of that needed to achieve the required breakout of the water and gas from the oil. This procedure led to significant improvements in pump efficiency due to gas breakout, and cleaner separation of the gas, water, and oil. However, no consistent improvement in oil production was achieved. It was found that this technique of dribbling the concentrate into the production well did not enable the concentrate to permeate into the formation surrounding the wellbore to break up foamy emulsion which blocks fluid flow.

One hundred seven producing wells that ranged in oil production capacity, prior to treatment, from 0 to 80 barrels per day (bpd) were also treated with a wellbore treatment composition by batch application. The composition was prepared by mixing the wellbore treatment concentrate with water (not deionized) at a 1:99 volume ratio. Several production wells were batch treated by pumping this composition down the annulus between the casing and the production tubing at a rate of about 180–200 gallons per minute while simultaneously actively pumping oil from the well. The amount of composition injected in each well was estimated to be about 15 gal. per foot of perforations (i.e., section of reservoirs opened to the well bore). After injection into each well was completed, production was shut down for at least two hours to allow the composition to permeate into the formation before returning to continuous production. Initially, for about the first day of production, mostly water was produced, but thereafter the oil production rate was typically three times the normal rate that was prior to treatment. For wells that showed enhanced production rate, the improvement lasted from about 10 days to several weeks, and in some cases substantially longer, before oil production returned to pretreatment levels.

Overall, approximately 70 percent of the wells experienced improved oil production after injection. For the other wells, 7 wells actually registered a decline in production although mechanical problems (e.g., pump malfunction) were the cause for several cases. Furthermore, a number of apparent failures were attributable to decreases in steam temperature and/or blockage of the wellbore by sand which was released into the wellbore after the treatment broke up the foamy emulsion.

Based on the assumption that the 107 wells would have continued to produce oil at the same levels had there been no injection treatment, the improvement in oil production during the 30 day period following injections was a total of 13,800 barrels. This represented an approximate 8.5% rise in overall production. (The cost of the stimulation treatment was recovered in only about two days of increased production. The incremental oil cost was less than one dollar per barrel.) As is apparent, had the mechanical, steam, and wellbore blockage problems been considered, the actual percentage improvement attributable to the inventive process and composition would have been even higher.

Similar testing demonstrated that Formulation II stimulates oil production even better than does Formulation I. Specifically, several production wells that showed only marginal improvement when injected with compositions prepared from Formulation I exhibited significant improvement when later injected with the same amounts of composition prepared from Formulation II. For example, some wells that originally produced about 10 bpd yielded 12–15 bpd when stimulated with compositions of Formulation I. However, the same wells yielded about 20 bpd when later stimulated with compositions of Formulation II. It is believed that Formulation II which does not include the stability agent (i.e., propylene glycol) is more effective because of its ability to transport the active anti-foaming component into the oily foam.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A system that is formed in a subterranean formation surrounding a wellbore comprising:
   a) a foamy emulsion comprising:
      (i) a gas phase comprising water vapor and a gas that is selected from the group consisting of carbon dioxide, methane, and mixtures thereof; and
      (ii) a continuous liquid phase comprising crude oil and brine; and
   b) a wellbore treatment composition which is a water external emulsion having a dispersed phase comprising:
      (i) a defoaming agent effective for extinguishing foams in oil-brine-gas systems wherein the defoaming agent is present in the dispersed phase and wherein the defoaming agent is selected from the group consisting of silicone oil, silicone oil emulsion, organic defoamer, emulsion of an organic defoamer, silicone-organic emulsion, silicone-glycol compound, silicone/silica adduct, emulsion of a silicone/silica adduct, and mixtures thereof;
      (ii) a demulsifying agent, effective for demulsifying oil external emulsions, that comprises a surface active agent selected from the group consisting of nonionic surface active agents, anionic surface active agents and mixtures thereof wherein said nonionic surface active agents are selected from the group consisting of ethoxylated alkyl phenols, ethoxylated alcohols, block copolymers of ethylene oxide and propylene oxide, oxyalkylated glycol esters, and mixtures thereof and wherein said anionic surface active agents are selected from a group consisting of alkyl benzene sulfonates, alkyl toluene sulfonates, ethoxylated carboxylates, carboxylates, and mixtures thereof; and
      (iii) optionally, a stabilizing agent effective for stabilizing said water external emulsion, wherein the stabilizing agent is selected from the group consisting of glycol, water soluble polymer and mixtures thereof; and
      (iv) water.

2. The system of claim 1 wherein said water comprises about 99.9 to 94 vol. % of said wellbore treatment composition.

3. The system of claim 1 wherein the dispersed phase comprises about 1 to about 20 wt % of said defoaming agent, about 1 to about 10 wt % of said demulsifying agent, and, optionally, up to about 20 wt % of said stabilizing agent.

4. The system of claim 1 wherein the dispersed phase further comprises an emulsifying agent effective to emulsify the defoaming agent wherein the emulsifying agent is present in an amount effective to form and maintain a stable emulsified dispersion of the defoaming agent in water.

5. The system of claim 1 wherein the defoaming agent is dispersed in a carrier solvent and wherein the wellbore treatment composition further comprises an emulsifying agent, for emulsifying the defoaming agent wherein the emulsifying agent is present in an amount effective to form and maintain a stable emulsified dispersion of the carrier solvent in water.

6. The system of claim 4 wherein the dispersed phase comprises about 1 to about 20 wt % of said defoaming agent, about 1 to about 10 wt % of said demulsifying agent, about 1 to about 15 wt % of said emulsifying agent, and, optionally, up to about 20 wt % of said stabilizing agent.

7. The system of claim 6 wherein said demulsifying agent comprises 1 or more surface active agents wherein each surface active agent independently comprises from about 0.5 to about 10 wt % of said wellbore treatment composition.

8. The system of claim 6 wherein said emulsifying agent comprises 1 or more second surface active agents wherein each second surface active agent independently comprises from about 0.5 to about 12 wt % of said wellbore treatment composition.

9. The system of claim 6 wherein said stabilizing agent comprises 1 or more stabilizers wherein each stabilizer independently comprises from about 0.1 to about 16 wt % of said dispersed phase.

10. The system of claim 4 wherein the defoaming agent is selected from the group consisting of silicone/silica adduct, and emulsion of a silicone/silica adduct.

11. The system of claim 3 wherein the defoaming agent is dispersed in a carrier solvent that is an organic liquid.

12. The system of claim 11 wherein the organic liquid is select from the group consisting of paraffins, isoparaffins, cycloparaffins and mixtures thereof.

13. The system of claim 5 wherein the defoaming agent comprises a silicone/silica adduct or an emulsion of a silicone/silica adduct.

14. The system of claim 5 wherein the stabilizing agent is a glycol.

15. The system of claim 14 wherein the glycol is selected from the group consisting of ethylene glycol, propylene glycol, glycerol, polyethylene glycol, polypropylene glycol, and mixtures thereof.

16. The system of claim 5 wherein said stabilizing agent comprises a water soluble polymer.

17. The system of claim 16 wherein said water soluble polymer is selected from the group consisting of carboxymethyl cellulose, hydroxyethyl cellulose and other water soluble modified cellulosic polymers, xanthan gums, polyacrylamides, polysiloxane polyalkyl polyether copolymers, anionic acrylic copolymers, alkali metal alginates and other water soluble alginates, carboxyvinyl polymers, polyvinylpyrollidones, polyacrylates, and mixtures thereof.

18. The system of claim 5 wherein said demulsifying agent comprises said nonionic surface active agents.

19. The system of claim 5 wherein said demulsifying agent comprises said anionic surface active agents.

20. The system of claim 1 wherein the wellbore treatment composition extinguishes the foamy emulsion.

* * * * *